United States Patent [19]

Coussau et al.

[11] Patent Number: 4,600,115
[45] Date of Patent: Jul. 15, 1986

[54] TEMPORARY OBTURATION PANEL OF A PASSAGE INSIDE A VESSEL ACCESSIBLE ONLY THROUGH AN ORIFICE OF SMALLER SIZE

[75] Inventors: Jean Coussau, Paris; Claude Lavaleric, L'Isle Adam, both of France

[73] Assignee: Framatome & Cie, Courbevoie, France

[21] Appl. No.: 667,192

[22] Filed: Nov. 1, 1984

[51] Int. Cl.⁴ ............................................. B65D 45/00
[52] U.S. Cl. .................................................. 220/327
[58] Field of Search ...................... 220/327; 176/87, 38

[56] References Cited

U.S. PATENT DOCUMENTS 3,926,722 12/1975 Dupen .................................. 220/327
3,963,565 6/1976 Beine .................................... 220/327

Primary Examiner—George T. Hall
Attorney, Agent, or Firm—Pollock, Vande Sande & Priddy

[57] ABSTRACT

The invention relates to a temporary sealing obturation panel, inside a vessel accessible only through a manhole, of a passage provided on its periphery with a support collar. It is constituted by: panels articulated by flexible fluid-tight hinges, bordered by lines of latching pins, stiffeners comprising lines of holes conjugate with the lines of pins, a frame in at least two articulated parts, with means for gripping the ends of the panels and the stiffeners against the support collar. The invention is applicable to the closing of primary circuit ducts opening into the water box of a steam generator of a pressurized water nuclear boiler.

4 Claims, 6 Drawing Figures

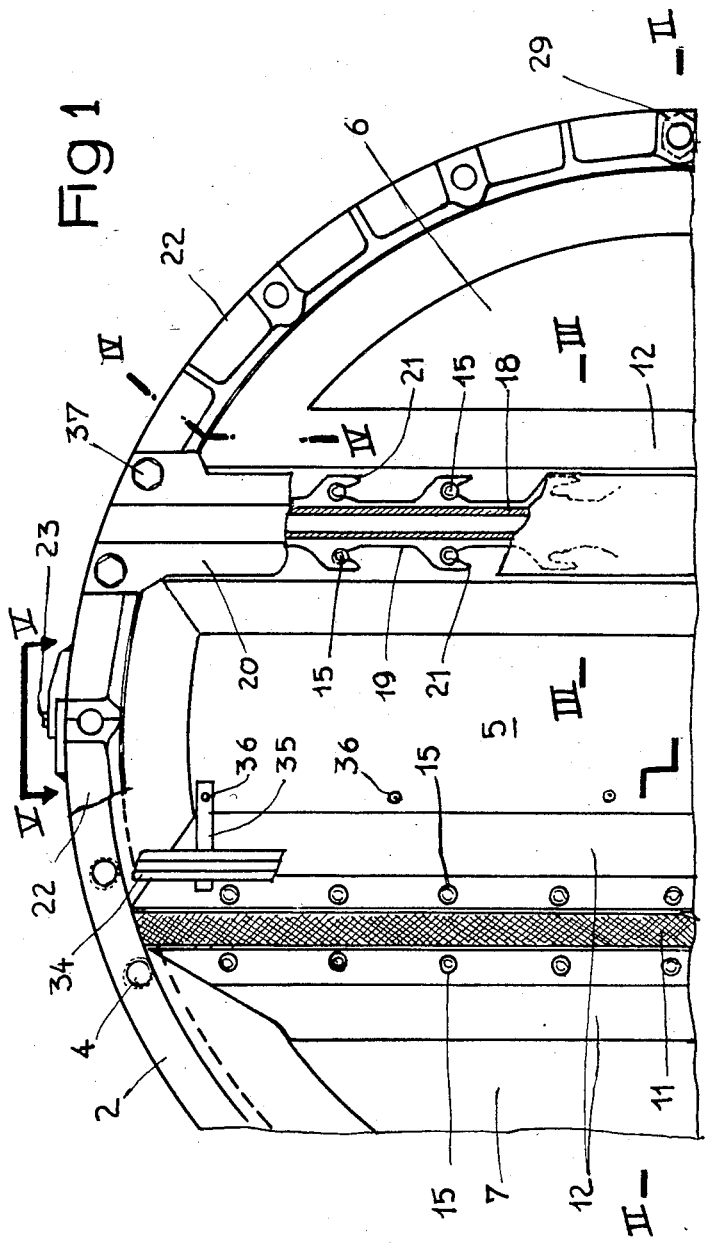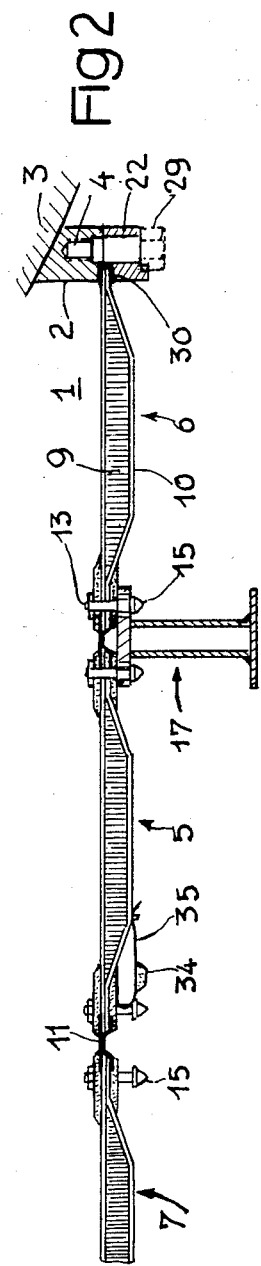

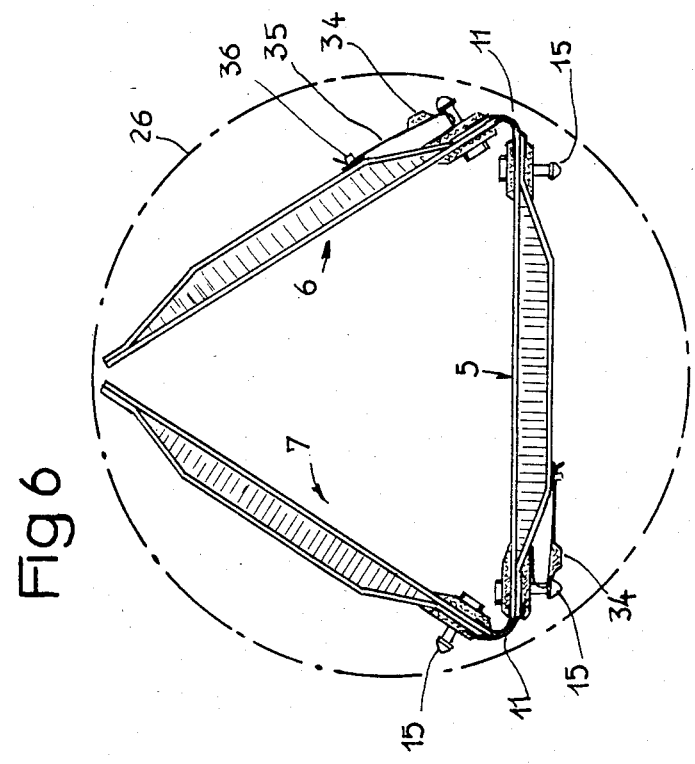
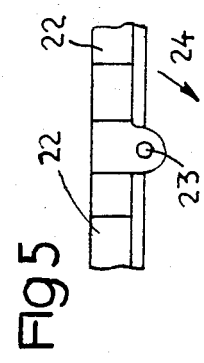
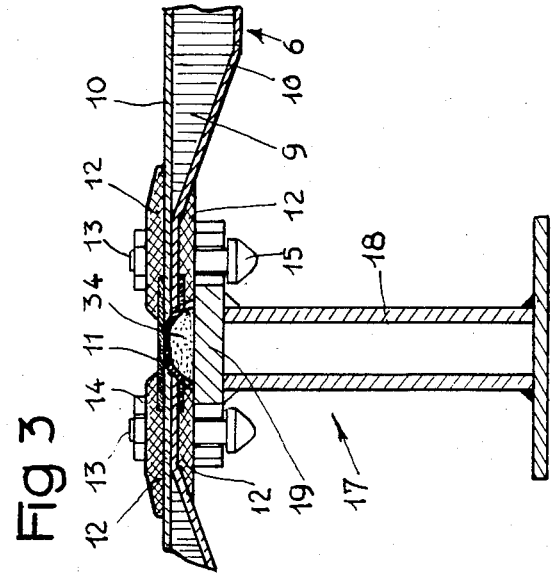
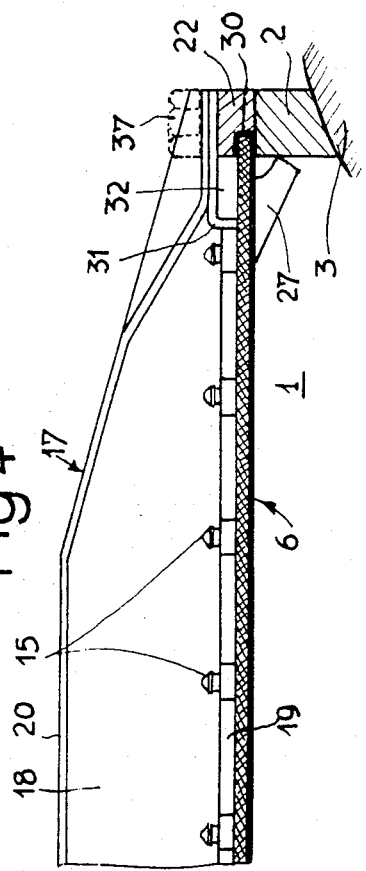

TEMPORARY OBTURATION PANEL OF A PASSAGE INSIDE A VESSEL ACCESSIBLE ONLY THROUGH AN ORIFICE OF SMALLER SIZE

FIELD OF THE INVENTION

The present invention relates to a panel for the temporary fluid-tight obturation of a passage inside a vessel accessible only through an orifice of dimensions less than those of the passage to be closed. The invention finds a particularly effective use for the temporary closure of the junction aperture on the water box of a steam generator, of a duct of the primary circuit of a pressurized water nuclear reactor.

In a nuclear reactor the pressurized water of the primary circuit flows between the reactor proper where, in contact with fuel elements it absorbs the heat resulting from the nuclear reactions, and a steam generator where this heat is used to produce the steam then directed to the turbo-alternator units if the reactor is used in a nuclear electricity generating station.

The steam generator is generally constituted by a bundle of U-tubes mounted on a tube plate with a hemispherical water box divided into two by a partition separating two chambers; the water coming from the tank of the reactor enters one of the chambers, traverses the U tubes and is collected in the other chamber whence it is pumped to be sent to the reactor. The junction apertures of the primary circuit on the chambers of the water box are of relatively large size, of the order, for example, of a meter in diameter.

It is periodically necessary to have access inside the two chambers of the water box, for example, for operations of checking and maintenance. There is therefore provided an access aperture, but since the primary fluid is under considerable pressure, it is preferred to give the access aperture as small a cross-section as possible, of the order of 400 mm, that is to say of a diameter normally just sufficient for the passage of a man provided with a protective combination.

During such operations the flow of primary fluid is normally stopped and the steam generator chambers are empty. It is however necessary to close the apertures through which the flow pipes for the primary fluid communicate, first for pschological reasons, as the operator can fear falling into this yawning aperture, and then for safety reasons to prevent an inadvertent arrival of water in the chambers at the bottom of the generator.

PRIOR ART

French patent no. 76-03456, of Applicant, describes an embodiment of such an obturation panel enabling both its introduction into elements separated by the small cross-section access manhole, its rapid positioning on a support collar surrounding the aperture, and its rapid fixing by screwing to the support collar. Such a device is however only capable of supporting hydrostatic pressures slightly higher than one bar, corresponding to the water height of the pool of the reactor.

In addition the continuous wish to improve the operating conditions in a contaminated medium leads to proceeding with decontamination operations. The development of the chemical techniques of decontamination of the constituents of the primary circuit of pressurized water reactors has enabled these operations to be carried out with the aid of a reagent highly diluted in water and brought to a temperature of about 135° C. which corresponds to a saturation pressure slightly greater than 3 bars absolute of the liquid contained in the chambers of the water box. In addition when the operation of decontamination must be carried out in the tube bundle, it is necessary, to avoid any vaporization phenomenon, to subject the liquid to an excess pressure of about 0.5 bar.

During operations of decontamination the obturators of the apertures of the primary circuit are then intended to isolate the generator which is at an overpressure of about 3.8 bars on the water box side surface. There must also be added a strength coefficient to the hydraulic testing procedures which can lead to subjecting the obturators to effective pressures exceeding 5 bars.

To be able to satisfy such restrictions the prior devices such as described by French patent no. 76-03456 must include constituent elements largely exceeding the weight of 25 daN generally allowed for rapid manipulations.

SUMMARY OF THE DRAWINGS

It is therefore an object of the present invention to provide a new solution to the problem of the rapid positioning of an obturation panel introduced into a vessel through an aperture of small size, and this by limiting the weight of the elements to be introduced separately and successively into the vessel.

The invention therefore applies to a temporary fluid-tight obturation panel of a passage inside an enclosure accessible only through an aperture of dimensions less than those of the passage to obturated, the periphery of the passage to be obturated including a support collar provided with threaded bores. According to the invention, the panel is constituted by:
at least two panels hinged to one another by flexible fluid-tight hinges, the size and the number of the panels being determined to permit the passage through the access aperture of the set of panels folded on one another, each panel comprising along its articulated edges a series of latching pins.
a set of stiffeners equal in number to that of the hinges of the panel, each stiffener comprising two lines of holes conjugate with the lines of latching pins of two contiguous panels,
a frame in at least two parts articulated and foldable on one another, reproducing in unfolded position the contour of the support collar and comprising means to grip, with the interposition of a seal, the ends of the panels and stiffeners against the support collar, by screwing into the threaded bores.

According to a preferred embodiment of the invention the panels are constituted of light metal alloy coated with carbon fiber bonded with resin, and the flexible hinges are formed of a corrosion-resistant elastomer.

BRIEF DESCRIPTION OF THE DRAWINGS

The invention will be better understood with reference to a particular embodiment shown in the accompanying drawings, this embodiment being given purely by way of example in an application to the obturation of the junction aperture of the primary circuit of a nuclear reactor on the water box of a steam generator.

FIG. 1 is a limited view from above, with partial sections of an obturator in position on the support collar of the aperture.

FIG. 2 is a section along the line II—II of FIG. 1.

FIG. 3 shows on a larger scale the detail of the assembly of a stiffener on the obturator, along the line III—III of FIG. 1.

FIG. 4 shows the detail of the fastening of the end of a stiffener and of a panel on the support collar, along the line IV—IV of FIG. 1.

FIG. 5 shows the articulation of the fastening frame along the line V—V of FIG. 1.

FIG. 6 shows the panels in folded position for their passage through the aperture for access to the vessel.

DETAILED DESCRIPTION

If reference is first made to the set of FIGS. 1, 2 and 3 it will be seen that the periphery of aperture 1 to be closed is provided with an annular supporting collar 2 welded to the wall 3 of the vessel; the collar 2 comprises a series of threaded bores 4.

The obturator proper is here formed of three panels 5, 6 and 7, each constituted by a honeycomb structure 9 of light metal, itself coated with a layer 10 of composite materials of carbon fibers bounded by a resin.

The panels are joined together by a strip 11 of elastomer overmolded onto the parallel edges of the panels opposite each other, as can be seen better in FIG. 3 on a larger scale. The strips 11 thus form a flexible but sealing hinge between the panels 5 and 6 on the one hand and 6 and 7 on the other hand. The mechanical strength of the hinges is reinforced, on each surface of the panels, by strips 12 forming butt-plates, themselves of carbon fiber-resin composite material, and fixed to the panels by screws 13 and nuts 14. The head of the screws 13 is extended by latching pins 15 of mushroom shape projecting at regular intervals in line along the articulated edges of the panel.

Each panel 5, 6, 7 is calculated and dimensioned to be able, in itself, to withstand the operational or test pressures. To ensure rigidity in service of the flexible hinges 11 the device comprises separate stiffening girders 17, designed to be positioned on the hinges. The girders 17 are constituted by two webs of stainless steel 18 welded to two sill plates 19 and 20. The sill plate 19 is cut out to form openings in the form of hooks 21 which, by a slight longitudinal movement, come into gripping relationship beneath the heads of the latching pins 15, so as to lock in the same flat alignment the two edges of the two contiguous panels and so as to carry back onto the girder unit 17 the forces which would tend to cause the articulation 11 to fold. It will also be observed that through the overlapping heads of the pins 15 the transfer of the forces to the girder 17 is exerted in the same manner when pressure is applied to one or other surface of the panels.

The set of devices is completed by a crown 22, here circular, constituted of two portions articulated along a diametric axis 23 (FIG. 5), so as to permit each half-crown to fold back onto the other along the arrow 24.

Procedure will be as follows for the positioning of the obturator on the support collar 2 of the aperture to be closed. The constituent elements of the obturator are first introduced inside the chamber of the water box through the manhole of small diameter 26 (FIG. 6). The rectilinear girders 17 are introduced as such, while the crown 22 is introduced without difficulty once folded on itself into a half ring of small cross-section. The three articulated panels are also folded back on one another around the flexible hinges 11, and it is seen in FIG. 6 that their assembly then presents a sufficiently reduced bulk to pass through the manhole 26 without difficulty.

The operator having himself entered the water box, it is sufficient for him to unfold the panels and to position them on the collar 2, the operation being facilitated by center studs 27 fast to the panels; the rigidity itself of the panels is sufficient for the unit to remain in place in the absence of pressure on one or other surface.

After unfolding the crown 22 can then be placed in position to grip the edges of the panels against the girder 2 by means of screws 29 engaged in the threaded holes 4. The fluid-tightness of the assembly is ensured, after final tightening of the screws 29, by seals 30 arranged at the periphery of the group of panels Then the girders 17 will be berthed in the axis of the hinges 11, in a positin where the pins 15 are freed from the hooks 21. This is possible by means of the discontinuity of the extension 31 of the sill plate 19, which forms a longitudinal play 32 at each end of the girder 17. Before applying the girder 17 the shaped sectional element of elastomer 34 will have been folded back against the strip 11 which shaped element is intended to provide a supporting collar on the hinge strip 11. Previously, in order not to impede the handling of the panels and their folding, the shaped element 34 was held spaced by links 35 buttoned to fasteners 36. In FIG. 6 and in the left portion of FIGS. 1 and 2 are seen the shaped elements 34 in waiting position; in FIG. 3 and in the right-hand portion of FIG. 1 are seen on the other hand, the shaped elements 34 in supporting position of the flexible hinge 11.

By a longitudinal thrust of the girder 17 the two rows of pins 15 are then brought to grip the two rows of latches 21. The girders 17, thus fastened with the panels with locking of the flexible hinges 11, can then be in their turn fixed to the crown 22 and the collar 2 by screws 37 which ensure at the same time, as is seen in FIG. 4, support of the girders 17 and the tightening of the fluid-tight seal 30.

Of course the invention is not strictly limited to the embodiment which has been described by way of example, byt it also covers constructions which only differ therefrom in detail, in modifications of execution or in the use of equivalent means. Thus it must not be limited to the obturation of circular apertures, since it applies in the same way to the obturation of passages of any shape, and for example rectangular, whenever obturation must be formed within a vessel accessible only through an aperture of dimensions less than those of the passage to be obturated. The number and size of the panels will then be determined so as to be able to introduce the folded assembly through the access aperture and of course as many stiffening girders as articulations will then be provided. In the same way the clamping frame could also include several articulations, enabling it to be folded sufficiently to permit its passage through the access aperture.

In the same way, the support elements 34 could, as a modification, be bonded permanently beneath the sill plate 19 of the stiffening girders 17.

We claim:

1. Temporary fluid-tight obturation panel for a passage into a vessel accessible only through an aperture of dimensions less than those of the passage to be obturated, the periphery of the passage to be closed comprising a support collar provided with threaded holes, said obturation panel being constituted by:
   at least two panels articulated together by flexible fluid-tight hinges, the size and number of panels being determined to enable passage through the access aperture of the set of panels folded on one another, each panel comprising along its articulated edges a series of latching pins, a set of stiffeners equal in number to that of the hinges of the panel, each stiffener comprising two lines of holes conjugate with the lines of the latching pins of two contiguous panels, a frame in at least two parts articulated and foldable on one another, reproducing in folded position the contour of the support collar and comprising means to grip, with the interposition of a seal, the ends of the panels and of the stiffeners against the support collar, by screwing into the threaded holes.

2. Obturation panel according to claim 1, wherein the panels are constituted of light metallic alloy coated with carbon fibers bonded by resin.

3. Obturation panel according to claim 1, wherein the flexible hinges are formed of corrosion-resistant elastomer.

4. Obturation panel according to any preceding claim, comprising, associated with each hinge, a supporting sectional element interposed between the flexible hinge and the corresponding stiffener.

* * * * *